Sept. 15, 1931.   C. C. SPREEN   1,823,805
COMPRESSOR BEARING SEAL
Filed Dec. 27, 1926
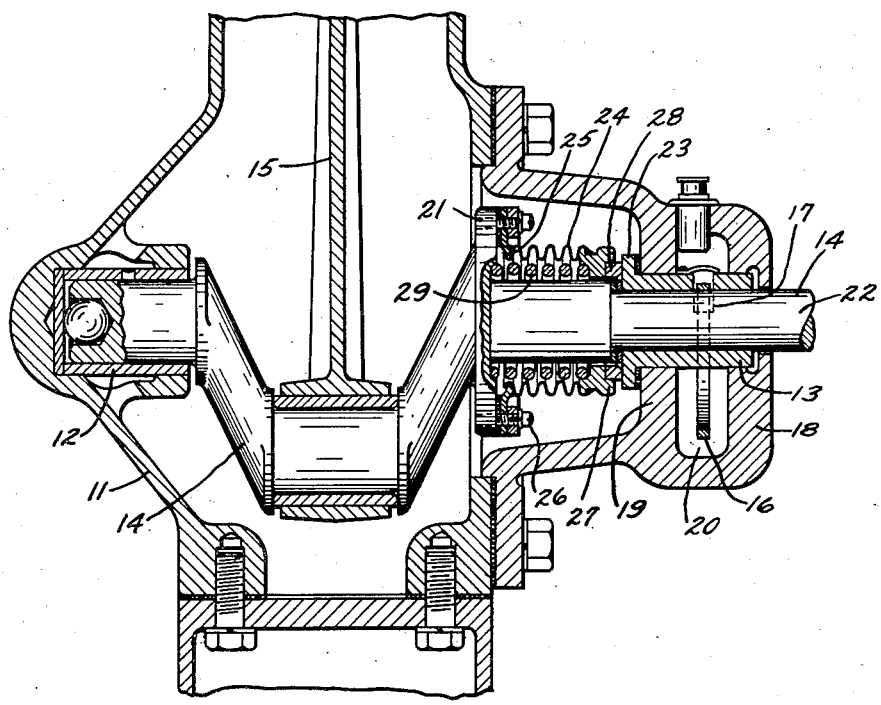
Charles C. Spreen
Inventor
By Smith and Freeman
Attorneys Patented Sept. 15, 1931

1,823,805

UNITED STATES PATENT OFFICE

CHARLES C. SPREEN, OF DETROIT, MICHIGAN

COMPRESSOR BEARING SEAL

Application filed December 27, 1926. Serial No. 157,209.

My invention relates to bearing seals, and particularly to means for sealing the drive shaft aperture in the casing of a refrigerant compressor, and the principal object of my invention is to provide new and improved means for this purpose. In the drawing accompanying this specification and forming a part of this application I have shown, for purposes of illustration, one form which my invention may assume, and in the drawing the single figure is a fragmentary central vertical section through a compressor showing the embodiment of my invention herein disclosed.

In the embodiment of my invention herein shown the lower portion of the compressor casing 11 is provided with a closed bearing 12 and an open-end bearing 13 arranged to jointly support a crank shaft 14 which receives between the bearings 12 and 13 the usual connecting rod 15. The crank shaft 14 projects through the open-end bearing 13 which is lubricated by means of a ring 16 riding on the shaft 14 in a slot 17 in the open-end bearing 13 intermediate inner and outer walls 18 and 19 which support the open-end bearing 13. The bearing supporting walls 18 and 19 form a receptacle 20 containing the lubricant to be fed by the lubricating ring 16. The crank shaft 14 is provided interiorly of the casing 11 with a circular flange 21, and is provided exteriorly of the open-end bearing 13 with an extension 22 adapted to receive a suitable driving connection, not shown. The open-end bearing 13 is provided on its inner end with an annular seat 23 surrounding the shaft opening in the open-end bearing 13.

Closing the shaft aperture in the open-end bearing 13, particularly to prevent both the egress of refrigerant and the ingress of moisture, is a seal herein shown as comprising a generally tubular flexible annular diaphragm 24 corrugated to increase its flexibility, attached at one end to a base 25 sealed to the flange 21 by means of bolts 26 passing through the base 25 and the flange 21 on the shaft 14 clamping the base 25 to the flange 21, and secured at its other end to a base 27 carrying an attached anti-friction ring 28 held in rotary sealing engagement with the seat 23 by means of a spring 29 which extends interiorly of the diaphragm 24 and is compressed between the base 27 and the inner face of the annular flange 21.

From the above description it will be apparent to those skilled in the art that I have provided a seal having a diaphragm extending substantially longitudinally of the shaft, disposed within the casing, fixed at its one end to the shaft, removable as a unit, and rotatably sealed at its other end to the casing by means of an anti-friction ring held thereagainst by a spring compressed between a flange formed on the shaft and the base attached with the other end of the diaphragm.

Under these circumstances it will be apparent to those skilled in the art that the embodiment of my invention herein shown accomplishes at least the principal object of my invention.

At the same time, it will also be obvious to those skilled in the art that the embodiment of my invention herein shown and described may be variously changed and modified without departing from the spirit of my invention or sacrificing the advantages thereof, and it will therefore be understood that the disclosure herein is illustrative only, and that my invention is not limited thereto.

I claim:

In a bearing seal, the combination with a compressor casing having an aperture, a substantially cylindrical closure for said casing aperture, said closure being provided with an aperture therethrough, a bearing sleeve adapted to fit in said closure aperture, said bearing sleeve being outwardly flanged at the end thereof adjacent the inner surface of said closure to form a seat thereon, and a crank shaft having a circular integral flange adjacent said bearing sleeve; of a seal structure disposed within said cylindrical closure and including a tubular bellows, bases secured to each end of said bellows, one of said bases being fixedly sealed to said crank shaft flange, an anti-friction ring secured to the other of said bases to form a rotatable frictional joint with said bearing flange, and spring means for resiliently maintaining the frictional joint between said seal structure and said bearing sleeve.

In testimony whereof I hereunto affix my signature.

CHARLES C. SPREEN.